(12) United States Patent
Su et al.

(10) Patent No.: US 10,883,657 B2
(45) Date of Patent: Jan. 5, 2021

(54) HANDHELD GIMBAL CONTROL METHOD AND HANDHELD GIMBAL

(71) Applicant: SZ DJI TECHNOLOGY CO., LTD., Shenzhen (CN)

(72) Inventors: Tie Su, Shenzhen (CN); Paul Pan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/569,084

(22) Filed: Sep. 12, 2019

(65) Prior Publication Data

US 2020/0003362 A1 Jan. 2, 2020

Related U.S. Application Data

(63) Continuation of application No. PCT/CN2018/071675, filed on Jan. 5, 2018.

(51) Int. Cl.
| | |
|---|---|
| *F16M 13/04* | (2006.01) |
| *F16M 11/12* | (2006.01) |
| *F16M 11/18* | (2006.01) |
| *G03B 17/56* | (2006.01) |
| *G02B 7/00* | (2006.01) |

(52) U.S. Cl.
CPC ........... *F16M 13/04* (2013.01); *F16M 11/12* (2013.01); *F16M 11/18* (2013.01); *G02B 7/005* (2013.01); *G03B 17/561* (2013.01)

(58) Field of Classification Search
None
See application file for complete search history.

(56) References Cited

U.S. PATENT DOCUMENTS

| | | | | |
|---|---|---|---|---|
| 4,217,606 | A | * 8/1980 | Nordmann | F16M 11/18 348/151 |
| 5,598,207 | A | * 1/1997 | Kormos | F16M 11/10 348/148 |
| 9,800,786 | B1 | * 10/2017 | Wei | F16M 11/123 |
| 2015/0244927 | A1 | * 8/2015 | Laroia | F16M 11/10 348/240.99 |
| 2016/0301845 | A1 | * 10/2016 | Bell | H04N 5/23203 |
| 2017/0045807 | A1 | * 2/2017 | Ye | B64D 47/08 |

(Continued)

FOREIGN PATENT DOCUMENTS

| | | |
|---|---|---|
| CN | 102662404 A | 9/2012 |
| CN | 204989728 U | 1/2016 |

(Continued)

OTHER PUBLICATIONS

The World Intellectual Property Organization (WIPO) International Search Report for PCT/CN2018/071675 dated Aug. 29, 2018 5 Pages.

*Primary Examiner* — William B Perkey
(74) *Attorney, Agent, or Firm* — Anova Law Group, PLLC

(57) ABSTRACT

A method of controlling a handheld gimbal includes obtaining an input instruction, and selecting one follow mode from a plurality of follow modes for following movement of an input device or a handheld member of the handheld gimbal based on the input instruction. The plurality of follow modes have different following speeds. The method further includes controlling movement of the handheld gimbal using the selected follow mode to follow the movement of the input device or the handheld member.

19 Claims, 4 Drawing Sheets

(56) References Cited

U.S. PATENT DOCUMENTS

2017/0310868 A1* 10/2017 Wei .................. H04N 5/2328
2018/0031951 A1*  2/2018 Wang ................ F16M 11/123
2019/0339591 A1* 11/2019 Wang ................. F16M 11/10

FOREIGN PATENT DOCUMENTS

| CN | 105518757 A | 4/2016 |
| CN | 107079103 A | 8/2017 |
| CN | 107466379 A | 12/2017 |

* cited by examiner

HANDHELD GIMBAL CONTROL METHOD AND HANDHELD GIMBAL

CROSS REFERENCE TO RELATED APPLICATIONS

This application is a continuation application of International Application No. PCT/CN2018/071675, filed on Jan. 5, 2018, the entire contents of which are incorporated herein by reference.

TECHNICAL FIELD

The present disclosure relates to control technology and, more particularly, to a handheld gimbal control method and a handheld gimbal.

BACKGROUND

An object may be mounted on a handheld gimbal, and the handheld gimbal can securely hold the object, arbitrarily adjust the object attitude (e.g., changing a height, an angle, and/or an orientation of the object), or stabilize the object to maintain a certain attitude. For example, a photograph device mounted on the handheld gimbal may capture stable, smooth, and multi-angle images or videos.

The photograph device mounted on the handheld gimbal may often move in various manners. For example, under a certain scenario, a user may rapidly rotate the handheld gimbal.

Controlling the movement of the handheld gimbal to track various sports activities is an urgent problem to solve.

SUMMARY

In accordance with the disclosure, there is provided a handheld gimbal control method and device, and a handheld gimbal, to track various sports activities.

In one aspect, there is provided a method of controlling a handheld gimbal including obtaining an input instruction, and selecting one follow mode from a plurality of follow modes for following movement of an input device or a handheld member of the handheld gimbal based on the input instruction. The plurality of follow modes have different following speeds. The method further includes controlling movement of the handheld gimbal using the selected follow mode to follow the movement of the input device or the handheld member.

In another aspect, there is provided a handheld gimbal including an input device configured to obtain an input instruction, a handheld member connected to the input device, a bracket connected to the input device, and a processor. The bracket include one or more axis assemblies each including an axis arm and an electric motor for driving the axis arm to move. The processor is configured to select one follow mode from a plurality of follow modes for following the input device or the handheld member based on the input instruction. The plurality of follow modes have different following speeds. The processor is further configured to control movement of the one or more axis assemblies using the selected follow mode to follow the movement of the input device or the handheld member.

BRIEF DESCRIPTION OF THE DRAWINGS

To more clearly illustrate the technical solution of the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, in some embodiments, when one component is "fixedly connected" or "connected" to another component, or one component is "fixed" to another component, the component may directly contact the another component, or may not directly contact the another component and may have something in-between.

Unless otherwise specified, all the technical and scientific terms used in the embodiments of the present disclosure refer to the same meaning commonly understood by those skilled in the art. The terminologies used in the present disclosure are intended to describe specific embodiments, and not to limit the scope of the present disclosure. The term "and/or" includes any and all combinations of one or more of the listed items.

The handheld gimbal may hold a load (e.g., a photograph device), and may be configured to fasten the load, change a height, an inclination angle, and/or an orientation, or to keep the load in a certain attitude.

In some embodiments, the handheld gimbal may hold other non-photograph devices. The handheld gimbal may be referred to as other names, for example, a load support frame, which is not limited by the present disclosure.

The handheld gimbal of the present disclosure will be described below with reference to FIG. 1.

Figure 1:
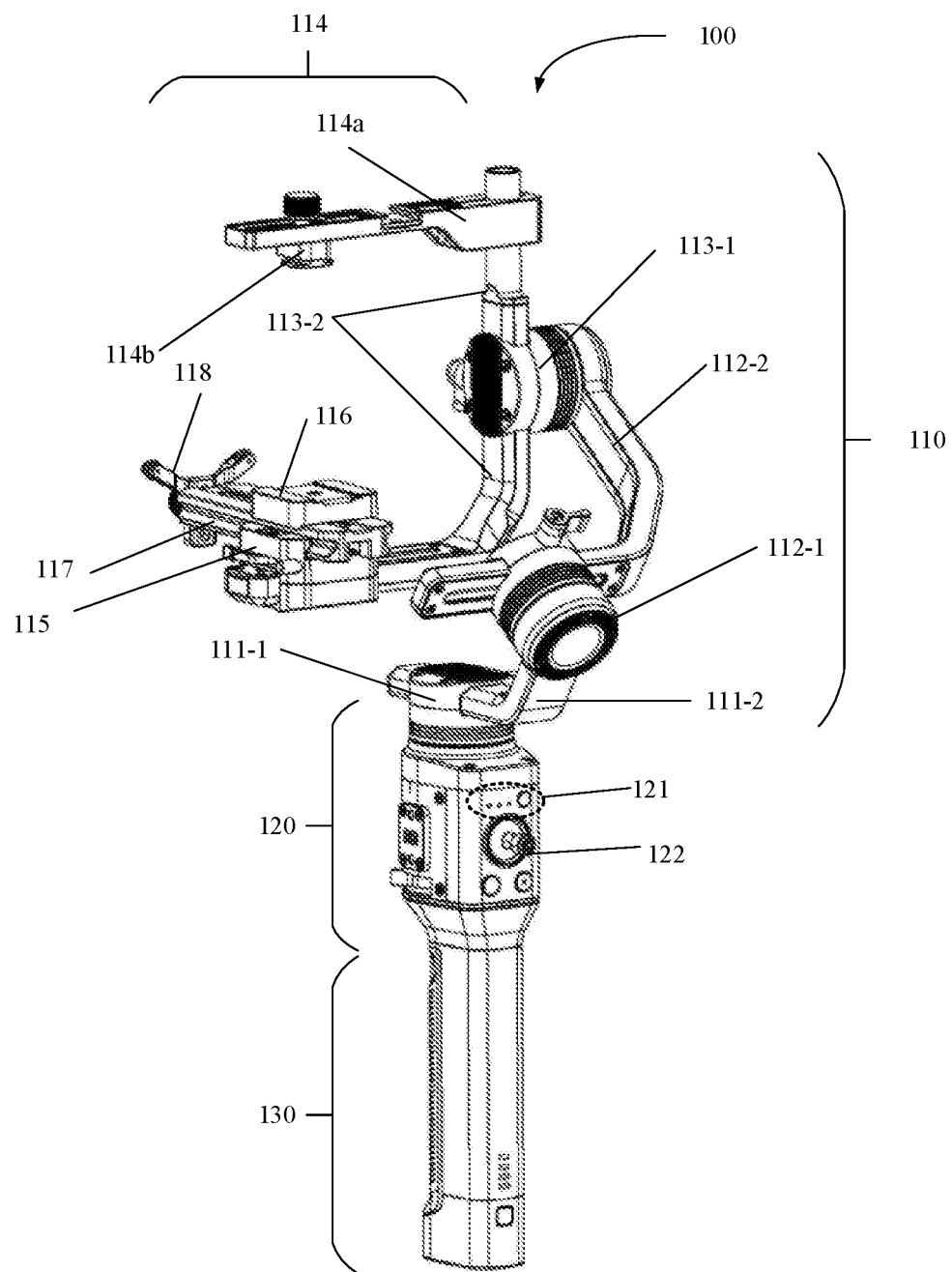
FIG. 1 is a schematic diagram of a handheld gimbal according to an example embodiment.

FIG. 1 is a schematic diagram of a handheld gimbal according to an example embodiment. As shown in FIG. 1, the handheld gimbal 100 includes a bracket 110, an input device 120 connected to the bracket 110, and a detachable handheld member 130 connected to the input device 120. The bracket 110 is connected to the handheld member 130 through the input device 120.

The bracket 110 includes a pitch axis assembly having a pitch axis electric motor 113-1 and a pitch axis arm 113-2, a roll axis assembly having a roll axis electric motor 112-1 and a roll axis arm 112-2, a yaw axis assembly having a yaw axis electric motor 111-1 and a yaw axis arm 111-2, a fastening assembly 115 directly connected to one side of the pitch axis arm 113-2, a sliding assembly having a slider 116 and a support plate 117 and disposed on the fastening assembly 115, a lens holder 118 disposed on the support plate 117, and a positioning assembly 114 connected to the other side of the pitch axis arm 113-2. The sliding assembly may slide relative to the fastening assembly 115. A photograph device is disposed on the sliding assembly. In some embodiments, the slider 116 may slide relative to the support plate 117. The support plate 117 may further slide relative to the fastening assembly 115. The support plate 117 may be fastened to the fastening assembly 115. In some embodiments, the sliding assembly may include only the support plate 117 sliding relative to the fastening assembly 115. The support plate 117 may directly hold the photograph device.

The pitch axis electric motor 113-1 may drive the pitch axis arm 113-2 to move. The roll axis electric motor 112-1 may drive the roll axis arm 112-2 to move. The yaw axis electric motor 111-1 may drive the yaw axis arm 111-2 to move.

The positioning assembly 114 may rotate relative to the pitch axis arm 113-2. The positioning assembly 114 may include a rotating arm 114a rotatable around the pitch axis arm 113-2 and a connecting member 114b configured to slide relative to the rotating arm 114a and to connect to the photograph device.

When in use, the photograph device may be fastened to the slider 116. The relative position between the connecting member 114b and the sliding assembly may be adjusted. When the connecting member 114b connects to a positioning portion of the photograph device, the sliding assembly may be locked to the fastening assembly 115 to hold the photograph device between the positioning assembly 114 and the fastening assembly 115. The lens holder 118 may hold a lens of the photograph device. The slider 116 or the support plate 117 of the sliding assembly may be slid to adapt to various types of long and/or short lens, or to zoom-in and zoom-out the lens.

An inertial measurement unit (IMU), such as at least one of an accelerometer or a gyroscope may be disposed inside the fastening assembly 115 to measure the attitude and acceleration of the photograph device. The IMU may also be disposed inside the positioning assembly 114.

It should be understood that the bracket 110 may include only one or two axis assemblies. Although the yaw axis assembly is connected to one end of the roll axis assembly and the pitch axis assembly is connected to the other end of the roll axis assembly as shown in FIG. 1, the arrangement is not intended to limit the present disclosure. The yaw axis assembly, the roll axis assembly, and the pitch axis assembly may be arranged differently.

The input device 120 may be configured for a user to input operation instructions to the handheld gimbal 100. The input device 120 may include a follow-mode input component 121 and a control joystick 122.

The control joystick 122 may control the movement of the axis assemblies, for example, rotating one of the axis assemblies of the handheld gimbal 100 in a direction corresponding to the respective axis assembly by toggling the control joystick 122.

The follow-mode input component 121 may allow a user to select one of follow modes described in the embodiments of the present disclosure.

In some embodiments, the follow-mode input component 121 may include three indicators on the left side and a control button on the right side. The control button is configured to select one of the follow modes. Each indicator may correspond to one of regular follow modes. When one of the regular follow modes is selected, the corresponding indicator may be lit.

The user may select one of the regular follow modes by briefly pressing the control button on the right side. For example, after the handheld gimbal 100 is powered up, the user may briefly press the control button on the right side once. The right-most indicator may be turned on, indicating that one of the regular follow modes corresponding to the right-most indicator is selected. Briefly pressing the control button once again may turn off the right-most indicator and turn on the center indictor, indicating that one of the regular follow modes corresponding to the center indicator is selected. When the same operation is repeated, the center indicator may turn off, and the left-most indicator may turn on, indicating that one of the regular follow modes corresponding to the left-most indicator is selected.

The user may long press the control button on the right side. When the user is persistently pressing or long pressing the button, the handheld gimbal 100 may enter a rapid follow mode. No indicator may be turned on. When the user releases the control button, the handheld gimbal 100 may return to the regular follow mode selected prior to the long press.

It should be understood that the manner of selecting one of the follow modes is not limited by the present disclosure.

For example, when the user briefly presses the control button three times in a row, the indicators may take turn to be turned on from the left to the right.

In some embodiments, the number of the indicators may not be limited to three. The number of the indicators may be less than three or more than three.

In some embodiments, the follow-mode input component 121 may include no indicators and may include a plurality of control buttons to match the number of the follow modes. Each control button may correspond to one of the follow modes.

In some embodiments, the follow-mode input component 121 may include a plurality of control buttons matching the number of the follow modes. Each control button may correspond to one of the follow modes. An indicator may be configured adjacent to each control button to indicate that the corresponding follow mode is selected.

In some embodiments, the follow-mode input component 121 may be disposed on other portion of the input device 120, for example, under the control joystick 122.

In some embodiments, in addition to the follow-mode input component 121 and the control joystick 122, the input device 120 may further include other components, for example, a power on/off switch of the handheld gimbal 100.

The input device 120 may be connected to the bracket 110. An IMU may be disposed in the input device 120 to measure the attitude and acceleration of the input device 120.

A processor may be disposed in the input device 120 to process inputted control instructions or to transmit/receive signals. The processor may be disposed in the handheld member 130.

In some embodiments, the processor may include a central processing unit (CPU). The processor may include another generic processor, a digital signal processor (DSP), an application specific integrated circuit (ASIC), a field programmable gate arrays (FPGA), or another programmable logic device, a discrete gate or transistor logic device, or a discrete hardware component, etc. The generic processor may include a microprocessor or any conventional processor.

The processor may communicate with a terminal. The user may configure the parameters for controlling the handheld gimbal 100 through an APP installed on the terminal, such as a speed parameter corresponding to one of the follow modes described in the embodiments of the present disclosure.

In some embodiments, the input device 120 may include another input interface, such as a display screen, for the user to configure one speed parameter for each follow mode.

The handheld member 130 may be detachably connected to the input device 120. The handheld member 130 may be a lanyard or a handle. The handheld member 130 may include a power on/off switch of the handheld gimbal 100, or an IMU configured to measure the attitude and acceleration, etc., of the handheld member 130. The handheld member 130 may further include a battery that supplies power to the handheld gimbal 100. The handheld member 130 may be connected to the input device 120 mechanically and electrically.

The handheld gimbal 100 has been described in the embodiments of the present disclosure. Controlling the movement of the handheld gimbal 100 is described below.

Figure 2:
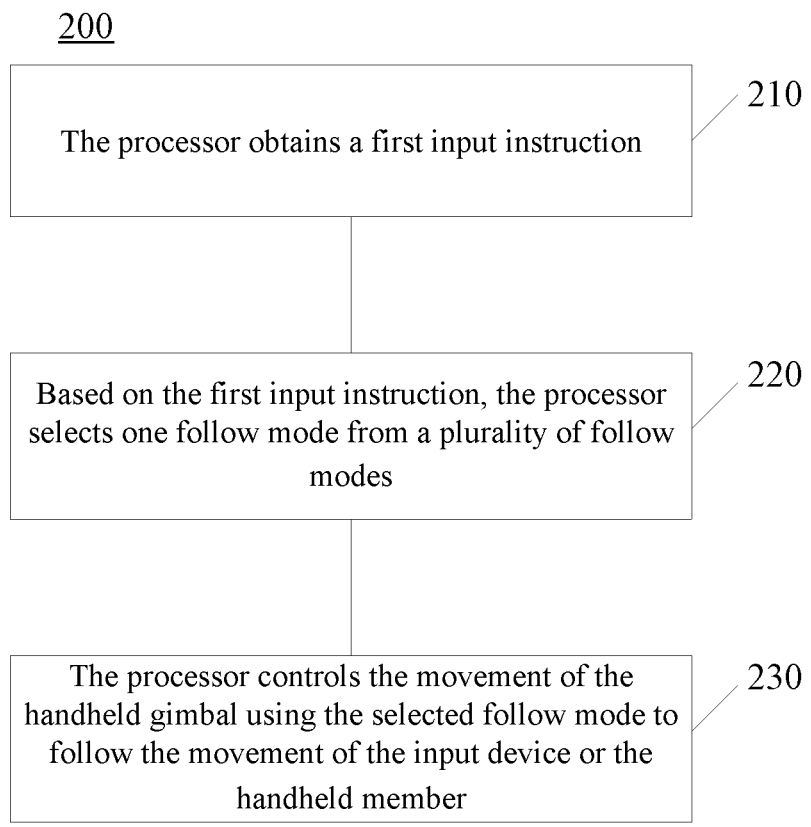
FIG. 2 is an illustrative diagram of a handheld gimbal control method according to an example embodiment.

FIG. 2 is a flow chart of a handheld gimbal control method according to an example embodiment. As shown in FIG. 2, the method 200 includes at least a portion of the following.

At 210, the processor obtains a first input instruction.

The first input instruction selects one from a plurality of follow modes for following the movement of the input device 120 or the handheld member 130 of the handheld gimbal 100. The plurality of follow modes may have different following speeds.

In some embodiments, a user may send instructions to the processor using the input device 120 (e.g., by pressing a control button) to notify the handheld gimbal 100 of entering one of the plurality of follow modes.

In some embodiments, the input device 120 may include at least one control button. The processor may obtain the first input instruction triggered by one of the at least one control button.

For example, in the handheld gimbal 100 shown in FIG. 1, the user may press the control button on the right-most side of a follow-mode input component 121 to input the first input instruction.

In some embodiments, the input device 120 may include a plurality of control buttons matching the number of the plurality of follow modes. The first input instruction triggered by one of the at least one control button may be used to select one of the plurality of follow modes.

In some embodiments, the plurality of control buttons may be disposed on the follow-mode input component 121 of the handheld gimbal 100 in FIG. 1 (replacing the control button and three indicators in FIG. 1). Each control button may correspond to one of the plurality of follow modes.

In some embodiments, the at least one control button may include a first control button. When the first control button persistently triggers the first input instruction, the processor may select another of the plurality of follow modes. The another of the plurality of follow modes may be a rapid follow mode.

In some embodiments, the user may persistently press the control button on the right-most side of the follow-mode input component 121 of the handheld gimbal 100. During the persistent pressing, the control button may repeatedly output the first input instruction to the processor, and the processor may control the handheld gimbal 100 to enter the rapid follow mode.

In some embodiments, when the first control button finishes persistently triggering the first input instruction, the handheld gimbal 100 may return to the follow mode before the first control button persistently triggered the first input instruction.

In some embodiments, the user may persistently press the control button on the right-most side of the follow-mode input component 121 of the handheld gimbal 100. During the persistent pressing, the control button may repeatedly output the first input instruction to the processor. The processor may control the handheld gimbal 100 to enter the rapid follow mode. When the user releases the control button, the handheld gimbal 100 may return to the previously selected follow mode and may follow the movement of the input device 120 or the handheld member 130 according to the previously selected follow mode.

In some embodiments, if the handheld gimbal 100 is in a non-follow mode before entering the rapid follow mode, the handheld gimbal 100 may return to the non-follow mode or may select one of the plurality of follow modes to follow.

In some embodiments, the plurality of follow modes may include a plurality of first follow modes. When the first input instruction is an instant instruction triggered by the first control button, one first follow mode may be selected from the plurality of first follow modes. The selected first follow mode may be a regular follow mode.

In some embodiments, more first follow modes may be sequentially selected from the plurality of first follow modes.

In some embodiments, the input device 120 may include a plurality of indicators. The plurality of indicators may correspond to the plurality of first follow modes. The processor may turn on the corresponding indicator when one of the plurality of first follow modes is selected.

In some embodiments, as shown in FIG. 1, the follow-mode input component 121 of the input device 120 includes three indicators, corresponding to three first or regular follow modes.

The user may briefly press the control button on the right side to select one of the three first or regular follow modes. For example, upon power-up of the handheld gimbal 100, the user may briefly press the control button on the right side once. The indicator on the right-most side may turn on, indicating that one of the three the first or regular follow modes corresponding to the right-most indicator is selected. The user may briefly press the control button once again. The right-most indicator may turn off and the center indicator may turn on, indicating that one of the three first or regular follow modes corresponding to the center indicator is selected. The user may briefly press the control button once again. The center indictor may turn off and the left-most indicator may turn on, indicating that one of the three first or regular follow modes corresponding to the left-most indicator is selected.

In some embodiments, the handheld gimbal 100 may use another manner to select one of the plurality of follow modes through the control button, which is not limited by the present disclosure.

In some embodiments, the plurality of follow modes may have different following speeds in terms of a maximum following speed, an average following speed, or a minimum following speed.

In some embodiments, not following may be considered a non-follow mode.

At 220, based on the first input instruction, the processor selects one follow mode from a plurality of follow modes.

At 230, the processor controls the movement of the handheld gimbal using the selected follow mode to follow the movement of the input device or the handheld member.

In some embodiments, the processor may obtain a second input instruction. Based on the second input instruction, the processor may determine axis assemblies of the handheld gimbal 100 that need to move and may control the movement of the pertaining axis assemblies using the selected follow mode.

In some embodiments, the user may select individual axis assembly to follow using the input device 120 (assuming that desired control components are configured in the input device 120) or an APP installed on a terminal, which includes whether the roll axis assembly follows, whether the pitch axis assembly follows, and whether the yaw axis assembly follows.

Thus, after obtaining the instruction inputted by the user, the processor may determine the pertaining axis assemblies, and may control the movement of the pertaining axis assemblies.

In some embodiments, the second input instruction may correspond to certain follow modes. That is, the second input instruction may be used to determine the pertaining axis assemblies that need to follow in the certain follow modes and may not be used to determine the pertaining axis assemblies that need to follow in other follow modes different from the certain follow modes.

In some embodiments, the second input instruction may be applicable to all of the plurality of follow modes. That is, the second input mode may be used to determined the pertaining axis assemblies that need to follow in all of the plurality of follow modes.

In some embodiments, when the following speed (e.g., the maximum following speed, the average following speed, or the minimum following speed) in any of the plurality of follow modes is the maximum or exceeds a certain threshold, a roll axis arm of the handheld gimbal 100 may maintain a horizontal attitude or not follow.

In some embodiments, when the following speed (e.g., the maximum following speed, the average following speed, or the minimum following speed) in any of the plurality of follow modes is the maximum or exceeds a certain threshold, a yaw axis arm of the handheld gimbal 100 may maintain a horizontal attitude or not follow.

In some embodiments, when the following speed (e.g., the maximum following speed, the average following speed, or the minimum following speed) in any of the plurality of follow modes is the maximum or exceeds a certain threshold, a pitch axis arm of the handheld gimbal 100 may maintain a horizontal attitude or not follow.

In some embodiments, the plurality of follow modes may include a first follow mode and a second follow mode. In the first follow mode, a first speed is calculated to control the handheld gimbal 100. In the second follow mode, a second speed is calculated and the first speed and the second speed are summed to control the handheld gimbal 100.

That is, compared to the first follow mode, the second follow mode may have a control speed higher by the second speed. The control speed of the second follow mode may be higher than the control speed of the first follow mode.

The first follow mode may be referred to as a regular follow mode. The second follow mode may be referred to as a rapid follow mode.

The first speed and the second speed may be calculated as follows.

In some embodiments, the first speed may be determined based on a difference between the actual attitude of the photograph device held by the handheld gimbal 100 and the actual attitude of the input device 120 or the handheld member 130.

In some embodiments, the actual attitude of the input device 120 or the handheld member 130 may be subtracted by the actual attitude of the photograph device and a dead band to obtain the amount of the attitude that the photograph device needs to be adjusted. Based on an acceleration of the input device 120 or the handheld member 130, an amount of a dynamic following change may be determined. The amount of the attitude that the photograph device needs to be adjusted may be multiplied by the amount of the dynamic following change and a pre-configured speed coefficient to obtain the first speed.

In some embodiments, an inertial measurement unit (IMU) may be used to determine the actual attitude of the photograph device. No relative movement may exist between the IMU and the photograph device. The IMU may be disposed on the positioning assembly 114 or the fastening assembly 115.

In some embodiments, the attitude of the photograph device may be obtained by performing an integral correction to the measurements of the gyroscope and the accelerometer in the IMU disposed on the positioning assembly 114 or the fastening assembly 115. Because the photograph device is fastened to the fastening assembly 115 or the positioning assembly 114, the attitude of the IMU is the same as the attitude of the photograph device.

In some embodiments, movement data of the IMU fastened to the fastening assembly 115 or the positioning assembly 114 and electric motors of the handheld gimbal 100 may be used to determine the actual attitude of the input device 120 or the handheld member 130.

In some embodiments, after obtaining the attitude through the IMU fastened to the fastening assembly 115 or the positioning assembly 114, the processor may perform calculation based on encoder data from the three electric motor axes (e.g., the pitch axis, the roll axis, and the yaw axis) of the handheld gimbal 100 to obtain the attitude of the input device 120 or the handheld member 130.

In some embodiments, the processor may calculate an attitude difference atti_err between the actual attitude of the photograph device and the actual attitude of the input device 120 or the handheld member 130. The attitude difference atti_err may be subtracted by the dead band dead_band, to obtain a following error (also referred to as an attitude error) follow_err. The processor may multiply the following error follow_err by an acceleration coefficient follow_acc_coef to obtain a speed coefficient speed_coef.

The IMU disposed on the input device 120 or the handheld member 130 may output an angular velocity omega_base of the input device 120 or the handheld member 130. The IMU disposed on the fastening assembly 115 or the positioning assembly 114 may output an angular velocity omega_camera of the photograph device. If the angular velocity omega base of the input device 120 or the handheld member 130 suddenly increases and becomes substantially larger than the angular velocity omega_camera of the photograph device, the speed coefficient speed_coef of the handheld gimbal 100 may be multiplied by an amount of the dynamic following change speed dynamic_coef. If the angular velocity omega_base of the input device 120 or the handheld member 130 suddenly decreases but the angular velocity omega_camera of the photograph device remains unchanged, the amount of the dynamic following change speed_dynamic_coef may remain unchanged to prevent a sudden change of the following speed of the handheld gimbal 100.

The following error follow_err may be multiplied by the speed coefficient speed_coef and the amount of the dynamic following change speed_dynamic_coef to obtain the following speed follow_speed. An integration calculation may be performed on the following speed follow_speed and the result may be added to a target attitude of the handheld gimbal 100.

In some embodiments, the dead band dead_band used in calculation of the first speed in the second follow mode may be smaller than the dead band dead_band used in calculation of the first speed in the first follow mode.

Compared to the first follow mode, the second follow mode may have the greater first speed based on the above calculation due to the smaller dead band dead_band.

In some embodiments, the amount of the dynamic following change speed_dynamic_coef used in calculation of the first speed in the second follow mode may be greater than the amount of the dynamic following change speed_dynamic_coef used in calculation of the first speed in the first follow mode.

Compared to the first follow mode, the second follow mode may have the greater first speed based on the above calculation method due to the greater amount of the dynamic following change speed_dynamic_coef.

In some embodiments, the speed coefficient speed_coef used in calculating the first speed in the second follow mode may be greater than the speed coefficient speed_coef used in calculation of the first speed in the first follow mode.

Compared to the first follow mode, the second follow mode may have the greater first speed based on the above calculation method due to the greater speed coefficient speed_coef.

In some embodiments, the second speed may be determined by a difference between a current target attitude and a preceding target attitude in the process of controlling the handheld gimbal 100.

In some embodiments, an attitude difference between the current target attitude and the preceding target attitude of the photograph device in the control process may be divided by a length of a control time period to obtain the second speed.

In some embodiments, because the control of the handheld gimbal 100 is a differential control, the rotating speed may be determined by the difference between the target attitude and the actual attitude. In a certain follow mode, if the dead band dead_band, the amount of the dynamic following change speed_dynamic_coef, and/or the speed coefficient speed_coef are configured to be relatively large, the attitude difference atti_err of the handheld gimbal 100 may be relatively small, and it is unlikely to obtain a relatively large following speed follow_speed. Thus, a target rotating speed of the handheld gimbal 100 may be calculated before the difference between the target attitude and the actual attitude is calculated, and the target rotating speed may be added to the feedback-controlled target speed of the handheld gimbal 100.

In some embodiments, the difference between the current target attitude and the preceding target attitude may be calculated. An updating time interval between the current target attitude and the preceding target attitude may be calculated. Based on the principle of speed=distance/time, the target attitude difference may be divided by the updating time interval to obtain the second speed of the handheld gimbal 100. The second speed derived from an attitude control closed loop may be added to the first speed to update the speed in an speed feedback control closed loop.

In some embodiments, the processor may control the movement of the handheld gimbal 100 at control time intervals. Calculating an amount of the movement of the handheld gimbal 100 at each control time interval may be equivalent to determining a movement speed of the handheld gimbal 100.

In some embodiments, in each control time interval, the amount of the attitude (obtained by calculating the difference between the actual attitude of the input device 120 or the handheld member 130 and the attitude of the photograph device in real time) that the photograph device needs to be adjusted may be calculated in real time, and/or the angular velocity of the input device 120 or the handheld member 130 and the angular velocity of the photograph device may be calculated in real time. The real time calculation may refer to performing the calculation once every control time interval. The results may be different at different control time intervals.

In some embodiments, both the first follow mode and the second follow mode may involve calculating the first speed but may not need to add the second speed. The difference between different follow modes may include the differences of the dead band, the amount of the dynamic following change, and/or the speed coefficient.

In some embodiments, the processor may obtain a third input instruction. Based on the third input instruction, the processor may pre-configure the parameters for determining the following speeds in various follow modes in the handheld gimbal 100.

In some embodiments, the user may configure the following speed through the APP. In particular, the user may configure the parameters for determining the following speeds in various follow modes. For example, the configuration may include at least one of the dead band, the amount of the dynamic following change, or the speed coefficient. The at least one of the dead band, the amount of the dynamic following change, and the speed coefficient may be configured for each follow mode.

The user may configure the parameters for each follow mode, respectively. When the user presses the control button, the processor may distinguish a time duration the user presses the control button, whether it is continuously pressed, and the prior follow mode to determine a current follow mode and may retrieve the parameters of the current follow mode to calculate the following speed in the current follow mode.

The plurality of follow modes may correspond to different users or may be set by a same user.

In some embodiments, a plurality of parameter sets may be pre-configured in the handheld gimbal 100. Each parameter set may be used to determine the following speeds in various follow modes. The processor may obtain a fourth input instruction. Based on the fourth input instruction, one parameter set may be selected from the plurality of parameter sets to calculate the following speeds in various follow modes.

In some embodiments, the user may configure the plurality of parameter sets through the APP. Each parameter set may be used to determine the following speeds in various follow modes. The user may select one parameter set corresponding to a particular scenario. In some embodiments, the user may configure one parameter set only for the user through the APP. When the user operates the handheld gimbal 100, the user may select the one parameter set configured by the same user.

For a clearer understanding of the present disclosure, the embodiments of the present disclosure are described below with reference to the control method of the handheld gimbal 100 shown in FIG. 3.

Figure 3:
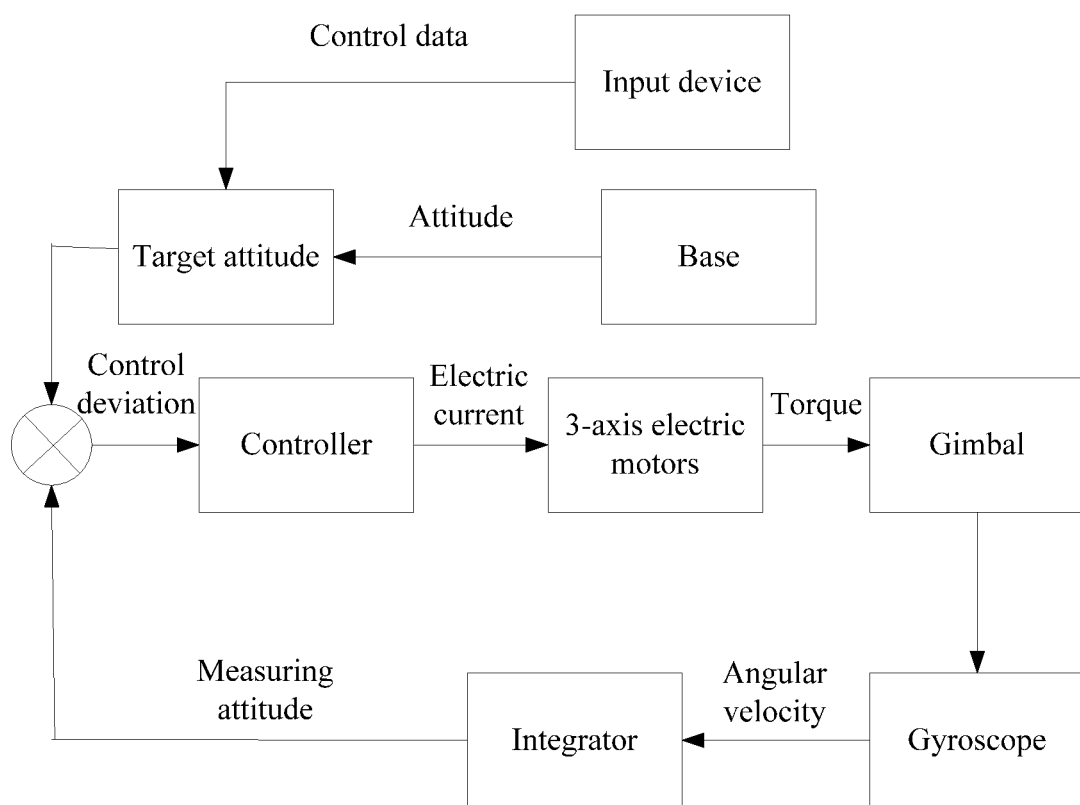
FIG. 3 is an illustrative diagram of a handheld gimbal control method according to an example embodiment.

As shown in FIG. 3, a target attitude of a photograph device may be obtained according to an attitude of the input device 120 or the handheld member 130 and/or control data inputted by a user through the input device 120. The integrator may perform an integration operation on an angular velocity outputted by a gyroscope of an IMU to obtain a measured attitude of the handheld gimbal 100. The target attitude of the photograph device, the measured attitude of the handheld gimbal 100, and an acceleration of the input device 120 or the handheld member 130 may be combined to obtain a first speed of the handheld gimbal 100. Two adjacent target attitudes and a control time interval may be combined to obtain a second speed. Based on the first speed and the second speed, and taking into consideration of a control deviation, a control electric current may be outputted to a 3-axis electric motor. The 3-axis electric motor may produce a torque based on the control electric current to move the handheld gimbal 100.

A main control board may provide the target attitude of the photograph device. Based on the target attitude and the actual attitude of the photograph device, a processor may provide a feedback control to reduce the deviation between the actual attitude and the target attitude, such that the actual attitude of the photograph device is substantially equal to the target attitude of the photograph device. The handheld gimbal 100 may be controlled to move smoothly. The smooth movement of the handheld gimbal 100 is a mode that facilitates the target attitude of the photograph device to follow the attitude of the input device 120 or the handheld member 130 to rotate smoothly.

Thus, a rapidly moving follow mode in the embodiments of the present disclosure may facilitate capturing high motion sport activities, allowing the photograph device to fully follow the movement of the input device 120 or the handheld member 130 while maintaining the steadiness. As a result, the images may faithfully capture the liveliness of the sport activities. Moreover, the photograph device may be kept in a horizontal attitude on the roll axis while maintaining the steadiness. As a result, the captured images may always look upright, be free of high frequency jitter, and look steady.

Figure 4:
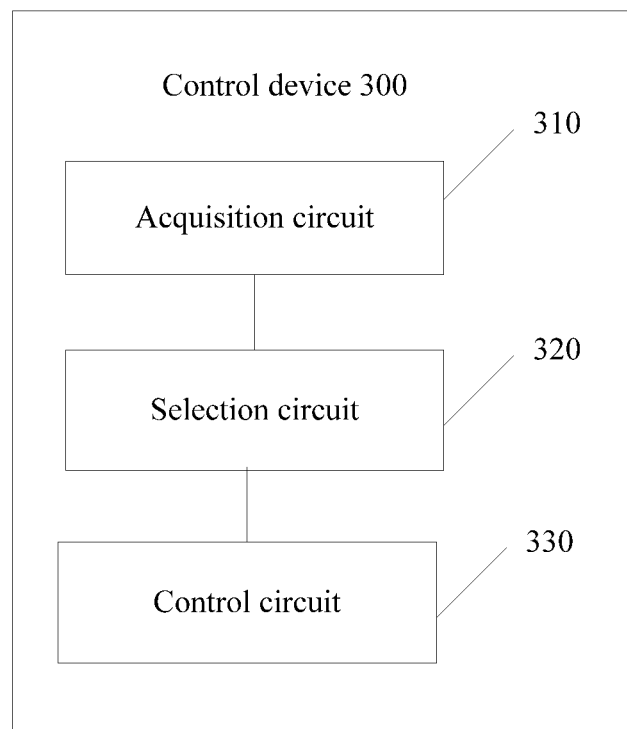
FIG. 4 is a block diagram of a handheld gimbal control device according to an example embodiment.

FIG. 4 is a block diagram of a handheld gimbal control device according to an example embodiment. As shown in FIG. 4, the control device 300 includes an acquisition circuit 310, a selection circuit 320, and a control circuit 330.

The acquisition circuit 310 is configured to obtain a first input instruction. The selection circuit 320 is configured to select a follow mode from a plurality of follow modes for following a movement of an input device or a handheld member of a handheld gimbal based on the first input instruction. The plurality of follow modes may have different following speeds. The control circuit 330 is configured to control the movement of the handheld gimbal using the selected follow mode to follow the movement of the input device or the handheld member.

In some embodiments, the acquisition circuit 310 may be configured to further obtain a second input instruction. The selection circuit 320 may be configured to determine axis assemblies of the handheld gimbal that need to move in the selected follow mode based on the second input instruction. The selected follow mode may be used to control the movement of the axis assemblies that need to be moved.

In some embodiments, when the following speed is the greatest among the plurality of follow modes, the roll axis arm of the handheld gimbal may be kept in a horizontal attitude.

In some embodiments, the plurality of follow modes may include a first follow mode and a second follow mode. In the first follow mode, a first speed may be calculated to control the movement of the handheld gimbal. In the second follow mode, a second speed may be calculated, and the first speed and the second speed may be summed to control the movement of the handheld gimbal. The first speed may be determined by a difference between an actual attitude of the photograph device mounted on the handheld gimbal and an actual attitude of the input device or the handheld member. The second speed may be determined by a difference between a current target attitude and a preceding target attitude in the process of controlling the handheld gimbal.

In some embodiments, the control circuit 330 may be configured to subtract the actual attitude of the photograph device and a dead band from the actual attitude of the input device or the handheld member to obtain an amount of attitude that the photograph device needs to be adjusted. Based on an acceleration of the input device or the handheld member, an amount of dynamic following change may be determined. The amount of the attitude that the photograph device needs to be adjusted may be multiplied by the amount of the dynamic following change and a pre-configured speed coefficient to obtain the first speed.

In some embodiments, the dead band used to calculate the first speed in the second following mode may be smaller than the dead band used to calculate the first speed in the first follow mode.

In some embodiments, the amount of the dynamic following change used to calculate the first speed in the second following mode may be greater than the amount of the dynamic following change used to calculate the first speed in the first follow mode.

In some embodiments, the speed coefficient used to calculate the first speed in the second following mode may be greater than the speed coefficient used to calculate the first speed in the first follow mode.

In some embodiments, the control circuit 330 may be configured to determine the actual attitude of the photograph device using an inertial measurement unit (IMU). No relative movement may exist between the IMU and the photograph device. Movement data of the IMU and electric motors of the handheld gimbal may be used to determine the actual attitude of the input device or the handheld member.

In some embodiments, the control circuit 330 may be configured to calculate an attitude difference between the current target attitude and the preceding target attitude of the photograph device in the control process, and to divide the attitude difference by a length of a control time interval, to obtain the second speed.

The control device 300 can perform various operations by the processor in the method 200 as shown in FIG. 2. For brevity, the descriptions are not repeated herein.

The present disclosure provides a handheld gimbal including a bracket, an input device, a handheld member, and a processor. The bracket may be connected to the input device. The handheld member may be connected to the input device. The bracket may include at least one axis assembly connected in series. One end of the at least one axis assembly may be connected to the input device. The other end of the at least one axis assembly may be connected to a photograph device. Each axis assembly may include an axis arm and an electric motor configured to move the axis arm. The input device may be configured to obtain a first input instruction. The processor may be configured to select a follow mode from a plurality of follow modes for following movement of the input device or the handheld member of the handheld gimbal based on the first input instruction obtained by the input device. The plurality of follow modes may have different following speeds. The selected follow mode may be used to control the movement of the at least one axis assembly to follow the movement of the input device or the handheld member.

In some embodiments, the input device may be configured to obtain a second input instruction. The processor may be configured to determine axis assemblies of the handheld gimbal that need to move in the selected follow mode based on the second input instruction obtained by the input device. The selected follow mode may be used to control the movement of the axis assemblies that need to be moved.

In some embodiments, when the following speed is the greatest among the plurality of follow modes, the roll axis arm of the handheld gimbal may be kept in a horizontal attitude.

In some embodiments, the plurality of follow modes may include a first follow mode and a second follow mode. In the first follow mode, a first speed may be calculated to control the movement of the handheld gimbal. In the second follow mode, a second speed may be calculated, and the first speed and the second speed may be summed to control the movement of the handheld gimbal. The first speed may be determined by a difference between an actual attitude of the photograph device mounted on the handheld gimbal and an actual attitude of the input device or the handheld member. The second speed may be determined by a difference between a current target attitude and a preceding target attitude in the control process of the handheld gimbal.

In some embodiments, the processor may be further configured to subtract the actual attitude of the photograph device and a dead band from the actual attitude of the input device or the handheld member to obtain the amount of the attitude that the photograph device needs to be adjusted. Based on an acceleration of the input device or the handheld member, an amount of dynamic following change may be determined. The amount of the attitude that the photograph device needs to be adjusted may be multiplied by the amount of the dynamic following change and a pre-configured speed coefficient to obtain the first speed.

In some embodiments, the dead band used to calculate the first speed in the second following mode may be smaller than the dead band used to calculate the first speed in the first follow mode.

In some embodiments, the amount of the dynamic following change used to calculate the first speed in the second following mode may be greater than the amount of the dynamic following change used to calculate the first speed in the first follow mode.

In some embodiments, the speed coefficient used to calculate the first speed in the second following mode may be greater than the speed coefficient used to calculate the first speed in the first follow mode.

In some embodiments, the handheld gimbal may include an inertial measurement unit (IMU). The processor may be further configured to determine the actual attitude of the photograph device using the IMU. No relative movement may exist between the IMU and the photograph device. Movement data of the IMU and electric motors of the handheld gimbal may be used to determine the actual attitude of the input device or the handheld member.

In some embodiments, the processor may be further configured to calculate an attitude difference between the current target attitude and the preceding target attitude of the photograph device. The attitude difference may be divided by a length of a control time interval to obtain the second speed.

In some embodiments, the processor may be configured to obtain a third input instruction. Based on the third input instruction, parameters used in calculating the following speeds in various follow modes may be configured in advance.

In some embodiments, the pre-configured parameters may include at least one of the dead band, the amount of the dynamic following change, or the speed coefficient, which are used in calculating the following speed.

In some embodiments, a plurality of parameter sets may be configured in the handheld gimbal. Each parameter set may be used to calculate the following speeds in various follow modes. The processor may be further configured to obtain a fourth input instruction. Based on the fourth input instruction, one parameter set may be selected from the plurality of parameter sets to calculate the following speeds in various follow modes.

In some embodiments, the input device may include at least one control button. The processor may be configured to obtain the first input instruction triggered by at least a portion of the at least one control button.

In some embodiments, the number of control buttons included in the input device may be the same as the number of the plurality of follow modes. The first input instruction triggered by one control button may be used to select one of the plurality of follow modes.

In some embodiments, the at least one control button may include a first control button. The processor may be configured to select a second follow mode when the first control button persistently triggers the first input instruction. When the first control button stops persistently triggering the first input instruction, the handheld gimbal may be controlled to return to the follow mode selected before the first control button persistently triggered the first input instruction.

In some embodiments, the plurality of follow modes may include a plurality of first follow modes. The processor may be further configured to select one first follow mode from the plurality of first follow modes when the first input instruction is an instant instruction triggered by the first control button.

In some embodiments, the processor may be further configured to select one first follow mode sequentially from the plurality of first follow modes.

In some embodiments, the input device may include a plurality of indicators. The plurality of indicators may be one-to-one corresponding to the plurality of first follow modes. The processor may be further configured to turn on a corresponding indicator when one of the plurality of first follow modes is selected.

In some embodiments, the bracket may include a positioning assembly, a fastening assembly, and a sliding assembly. The positioning assembly may be disposed on one side of an axis arm. The fastening assembly may be disposed on another side of the axis arm.

In some embodiments, the sliding assembly may be disposed on the fastening assembly and may slide relative to the fastening assembly. The sliding assembly and the positioning assembly may be used to hold the photograph device.

In some embodiments, the positioning assembly may include a rotating arm rotatable around the axis arm and a connecting member configured to slide relative to the rotating arm and to connect to the photograph device.

In some embodiments, the sliding assembly may include a support plate. The support plate may be disposed on the fastening assembly. The support plate may slide relative to the fastening assembly.

In some embodiments, the sliding assembly may further include a slider. The slider may slide relative to the support plate. The photograph device may be disposed on the slider.

In some embodiments, a lens holder may be disposed on one end of the support plate to hold the lens of the photograph device.

In some embodiments, the axis arm configured to connect the fastening assembly and the positioning assembly may be a pitch axis arm.

FIG. 1 may be referred to for the structure of the handheld gimbal. For brevity, the descriptions are not repeated here.

The processor in the handheld gimbal can perform various operations in the method 200 as shown in FIG. 2. For brevity, the descriptions are not repeated herein.

The foregoing descriptions are merely some implementation manners of the present disclosure, but the scope of the present disclosure is not limited thereto. Any change or replacement that can be conceived by a person skilled in the art based on the technical scope disclosed by the present application should be covered by the scope of the present disclosure. A true scope and spirit of the invention is indicated by the following claims.

What is claimed is:

1. A method of controlling a handheld gimbal comprising:
obtaining an input instruction;
based on the input instruction, selecting one follow mode from a plurality of follow modes for following movement of an input device or a handheld member of the handheld gimbal, the plurality of follow modes having different following speeds; and
controlling movement of the handheld gimbal using the selected follow mode to follow the movement of the input device or the handheld member,
wherein in a follow mode having a largest following speed among the plurality of follow modes, a roll axis arm of the handheld gimbal maintains a horizontal attitude.

2. The method of claim 1,
wherein the input instruction is a first input instruction;
the method further comprising:
obtaining a second input instruction; and
based on the second input instruction, determining axis assemblies of the handheld gimbal that need to move in the selected follow mode;
wherein controlling the movement of the handheld gimbal using the selected follow mode includes controlling movement of the axis assemblies that need to move using the selected follow mode.

3. The method of claim 1, wherein:
the plurality of follow modes include a first follow mode and a second follow mode;
in the first follow mode, the movement of the handheld gimbal is controlled according to a first speed determined by a difference between an actual attitude of a photograph device held by the handheld gimbal and an actual attitude of the input device or the handheld member; and
in the second follow mode, the movement of the handheld gimbal is controlled according to a sum of the first speed and a second speed determined by a difference between a current target attitude and a preceding target attitude in a process of controlling the handheld gimbal.

4. The method of claim 3, wherein the first speed is determined by:
subtracting the actual attitude of the photograph device and a dead band from the actual attitude of the input device or the handheld member to obtain an attitude amount that the photograph device needs to be adjusted;
based on an acceleration of the input device or the handheld member, determining an amount of dynamic following change; and
multiplying the attitude amount that the photograph device needs to be adjusted by the amount of the dynamic following change and a pre-configured speed coefficient to obtain the first speed.

5. The method of claim 4, wherein:
the dead band used in calculating the first speed in the second follow mode is smaller than the dead band used in calculating the first speed in the first follow mode; and/or
the amount of the dynamic following change used in calculating the first speed in the second follow mode is greater than the amount of the dynamic following change used in calculating the first speed in the first follow mode; and/or
the speed coefficient used in calculating the first speed in the second follow mode is greater than the speed coefficient used in calculating the first speed in the first follow mode.

6. The method of claim 4, further comprising:
determining the actual attitude of the photograph device using an inertial measurement unit (IMU), no relative movement existing between the IMU and the photograph device; and
determining the actual attitude of the input device or the handheld member using movement data of the IMU and electric motors of the handheld gimbal.

7. The method of claim 3, wherein the second speed is determined by:
calculating an attitude difference between the current target attitude and the preceding target attitude of the photograph device in the control process; and
dividing the attitude difference by a length of a control time interval to obtain the second speed.

8. The method of claim 1, further comprising:
obtaining another input instruction; and
based on the another input instruction, pre-configuring parameters used in determining the different following speeds of the plurality of follow modes in the handheld gimbal.

9. The method of claim 8, wherein:
the pre-configured parameters include at least one of a dead band, an amount of dynamic following change, or a speed coefficient, used in calculating the different following speeds.

10. The method of claim 1, wherein:
the handheld gimbal includes at least one control button; and
obtaining the input instruction includes:
obtaining the input instruction triggered by at least a portion of the at least one control button.

11. The method of claim 10, wherein:
a number of the at least one control button included in the handheld gimbal is the same as a number of the plurality of follow modes; and
the input instruction triggered by the at least a portion of the at least one control button is used to select the one follow mode from the plurality of follow modes.

12. The method of claim 10, wherein:
selecting the one follow mode includes:
- selecting a follow mode that controls the movement of the handheld gimbal according to a sum of a first speed and a second speed when one of the at least one control button persistently triggers the input instruction; and
- in response to the one of the at least one control button stopping persistently triggering the input instruction, controlling the handheld gimbal to return to a state before the one of the at least one control button persistently triggered the input instruction, wherein:
- the first speed is determined by a difference between an actual attitude of a photograph device held by the handheld gimbal and an actual attitude of the input device or the handheld member; and
- the second speed is determined by a difference between a current target attitude and a preceding target attitude in a process of controlling the handheld gimbal.

13. The method of claim 12, wherein:
the plurality of follow modes include a plurality of first follow modes that controls the movement of the handheld gimbal according to the first speed;
the follow mode that controls the movement of the handheld gimbal according to the sum of the first speed and the second speed is a second follow mode different from the plurality of first follow modes; and
selecting the one follow mode includes:
- selecting one first follow mode from the plurality of first follow modes when the input instruction is an instant instruction triggered by the one of the at least one control button.

14. The method of claim 13, wherein selecting the one first follow mode from the plurality of first follow modes includes:
selecting the one first follow mode according to an order of the plurality of first follow modes.

15. The method of claim 13,
wherein the handheld gimbal includes a plurality of indictors corresponding to the plurality of first follow modes, respectively; and
the method further comprising:
- in response to the one first follow mode is selected, turning on one of the indicators that corresponds to the one first follow mode.

16. A handheld gimbal comprising:
an input device configured to obtain an input instruction;
a handheld member connected to the input device;
a bracket connected to the input device and including one or more axis assemblies, each of the one or more axis assemblies including an axis arm and an electric motor for driving the axis arm to move; and
a processor configured to:
- select one follow mode from a plurality of follow modes for following the input device or the handheld member based on the input instruction, the plurality of follow modes having different following speeds; and
- control movement of the one or more axis assemblies using the selected follow mode to follow the movement of the input device or the handheld member,
wherein in a follow mode having a largest following speed among the plurality of follow modes, a roll axis arm of the handheld gimbal maintains a horizontal attitude.

17. The gimbal of claim 16, wherein:
the input instruction is a first input instruction;
the input device is further configured to obtain a second input instruction; and
the processor is further configured to:
- determine at least one of the one or more axis assemblies that needs to move in the selected follow mode based on the second input instruction; and
- control movement of the at least one of the one or more axis assemblies using the selected follow mode.

18. The gimbal of claim 16, wherein:
the plurality of follow modes includes a first follow mode and a second follow mode;
in the first follow mode, the movement of the handheld gimbal is controlled according to a first speed determined by a difference between an actual attitude of a photograph device held by the handheld gimbal and an actual attitude of the input device or the handheld member; and
in the second follow mode, the movement of the handheld gimbal is controlled according to a sum of the first speed and a second speed determined by a difference between a current target attitude and a preceding target attitude in a process of controlling the handheld gimbal.

19. A method of controlling a handheld gimbal comprising:
obtaining a first input instruction and a second input instruction;
based on the second input instruction, pre-configuring parameters used in determining different following speeds of a plurality of follow modes in the handheld gimbal;
based on the first input instruction, selecting one follow mode from the plurality of follow modes for following movement of an input device or a handheld member of the handheld gimbal; and
controlling movement of the handheld gimbal using the selected follow mode to follow the movement of the input device or the handheld member.

* * * * *